United States Patent [19]
Ertz

[11] Patent Number: 6,089,705
[45] Date of Patent: Jul. 18, 2000

[54] MANUALLY-TILTABLE ANTI-GLARE DEVICE

[76] Inventor: Paula Ertz, 1817 Commodore, Newport Beach, Calif. 92660

[21] Appl. No.: 09/333,600

[22] Filed: Jun. 15, 1999

[51] Int. Cl.$^7$ .................................................... G02C 7/10
[52] U.S. Cl. ..................................... 351/44; 351/47; 2/13
[58] Field of Search .................................. 351/44, 47, 57; 2/12, 13

[56] References Cited

U.S. PATENT DOCUMENTS

| | | | |
|---|---|---|---|
| D. 385,573 | 10/1997 | Ertz | D16/310 |
| 1,772,825 | 8/1930 | Costenbader | 351/47 |
| 2,640,988 | 6/1953 | Poole | 2/13 |
| 2,890,458 | 6/1959 | Hammond | 2/13 |
| 3,597,052 | 8/1971 | Dittman | 351/45 |
| 4,338,003 | 7/1982 | Adrian | 351/45 |
| 5,005,214 | 4/1991 | Koethe | 351/47 |
| 5,729,321 | 3/1998 | Wielhouwer | 351/44 |

FOREIGN PATENT DOCUMENTS 561182  4/1957  Italy.

*Primary Examiner*—Huy Mai
*Attorney, Agent, or Firm*—James G. O'Neill

[57] ABSTRACT

A manually-tiltable anti-glare device is provided for attachment to eyeglass frames or sunglasses to save lives by blocking the rays of a rising or setting sun, from eyes of a wearer the anti-glare device, while performing outdoor activities, or driving a vehicle. The manually-tiltable device is easily adjusted by the hand of the wearer, between partially lowered and raised positions, to follow the rising or descending sun, while, at the same time, allowing the wearer to safely walk, bike, hike, or see a roadway while driving. The anti-glare device includes a stop portion which prevents the anti-glare device from being moved downwardly or lowered to a vertical position in front of the wearer's eyes, thereby enhancing a walker's, hiker's, cyclist's or a driver's vision, and avoiding any dangerous accidents or conditions. The anti-glare device includes very dark lens-type portions, which are small enough to be seen around comfortably and safely, but which are large enough and high enough so as not to impair the walker's, hiker's, cyclist's or driver's peripheral or straight ahead vision. The very dark lens-type portions are positioned, sized and dimensioned so that they cover and protect the eyes of the wearer, no matter what the distance between the eyes of the wearer.

16 Claims, 3 Drawing Sheets

MANUALLY-TILTABLE ANTI-GLARE DEVICE

BACKGROUND OF THE INVENTION

1. Field of the Invention

This invention relates generally to sun blocking devices, and, more particularly, to a novel attachment for eyeglasses, frames or sunglasses to protect the eyes of a person walking, biking, hiking or driving from the blinding glare of the sun's rays when the sun is low, and to save lives.

2. Description of Related Art

The glare of the sun when it is low in the sky, when either rising or setting, is one of the most annoying and most often dangerous factors encountered by persons who operate a vehicle, such as an automobile, a bus, or a truck, either early in the morning after sunrise, or at sunset. This is particularly annoying and dangerous for people with light-sensitive eyes, older persons, or those with impaired vision for any reason. Many attempts have been made to overcome this problem, and include such devices as that set forth in U.S. Pat. No. 3,597,052 to Dittman. This patent discloses a glare filtering device having an elongated bar and two laterally spaced groups of spaced parallel blades that form vertical grids when in use. The two groups of blades or grids are disposed in front of two notches in a tinted plastic strip also carried by the bar. The bar may be removably secured on a spectacle frame by spring clips, and the spring clips may be fastened to a shaft pivotably mounted on straps that are secured to the bar, so that the anti-glare grids can be swung up out of the way during daylight, or swung down in front of the spectacles for use when the sun is low. This patent to Dittman, however, allows the anti-glare device to be swung to a vertical position in front of a person's eyes where a walker, hiker, cyclist, driver, etc. might have problems looking through the grids, thereby requiring the wearer to move or tilt their head to see on-coming traffic, etc.

Additionally, U.S. Pat. No. 4,338,003 to Adrian discloses a pair of anti-glare spectacles, comprising a frame and a pair of lenses, with each lens having a substantially circular central zone of substantially complete transparency and an adjoining light-absorbing annular zone over an angular range of substantially 45°, in which the light absorption increases sharply from the inside of the annulus, and drops toward the outside of the annulus by the square of the angle. An outer zone of each lens has a low absorption. These lenses require that a person wearing them move or tilt their head to avoid some glare, and the lenses are expensive to make and not comfortable for all persons to use or wear.

U.S. Pat. No. 5,729,321 ("'321") to Wielhouwer discloses a pair of sunglasses for preventing injury from the intense rays of the sun when lying in the sun, and includes a generally rectangular tinted transparent panel and a generally rectangular opaque sunshield rotatably mounted to a slender resilient headband, which supports the glasses on a forehead of a user. When the tinted transparent and opaque sunshields are both in vertical or horizontal positions, the opaque sunshield is in covering relationship to the tinted transparent panel. The opaque sunshield of the '321 patent completely blocks the sun, and is for use by a sun bather or person in the sun, and not to see, particularly, while driving a vehicle.

Additionally, the above-set forth patents, although they provide improvements in the art, tend to be complicated and expensive, and do not always allow a driver to safely see while looking into the lower rays of the sun, and are not suited for use with all pairs of glasses, or by all persons.

Therefore, there exists a long-standing need in the art for a low-cost and easy-to-use life-saving attachment or device for eyeglasses, frames, or sunglasses that will block substantially all of the light coming from low sun rays, to allow a person to comfortably and safely walk, bike, hike or drive a vehicle, when such low sun rays are present.

SUMMARY OF THE INVENTION

Accordingly, it is a general object of the present invention to provide an improved attachment for blocking the sun's rays. It is a particular object of the present invention to provide an improved device attachable to eyeglasses, a frame, or sunglasses for limited movement thereon, to substantially eliminate the glare of the sun's rays when the sun is low. It is another particular object of the present invention to provide an improved device, which can be removably attached to conventional eyeglasses or sunglasses for the purpose of filtering out objectionable sunrays, and which is adjustable between a partially lowered position and a completely raised position. It is yet another particular object of the present invention to provide an improved device which is manually tiltable partway down over a pair of eyeglasses, frames, or sunglasses to which the device is attached, and which blocks approximately 92% of the sun's rays, but which will still allow a person to barely see the position of the sun, if desired. And, it is still another particular object of the present invention to provide an improved device which is secured to a pair of eyeglasses, frames or sunglasses, and which may be easily and quickly operable between a partially lowered position and a raised position in a safe manner, and which contains areas or lens-shaped elements that are specifically shaped to cooperate with a person's eyes so as to substantially block all of the glare from the rays of the rising or setting sun.

These and other objects of the present invention are achieved by providing a device, which has a securing, means which is secured to eyeglasses, a frame, or sunglasses. The device has a substantially flat top and curved lens-shaped portions, which are sized and dimensioned to cooperate with the eyes of the user when rotated or moved downwardly approximately a quarter of the way from a vertical position, so as to substantially block the glare of the rays of the sun, when it is low. The device is comprised of a black or a very dark plastic, or a material coated with a black or very dark liner, which cuts out substantially all of the glare from the low rays of the sun.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein like reference numerals are used throughout the several views, and, in which:

DESCRIPTION OF THE PREFERRED EMBODIMENTS

The following description is provided to enable any person skilled in the art to make and use the invention and sets forth the best modes contemplated by the inventor of carrying out her invention. Various modifications, however, will remain readily apparent to those skilled in the art, since the generic principles of the present invention have been defined herein specifically to provide for an improved anti-glare device, lenses, or sun visor.

Figure 1:
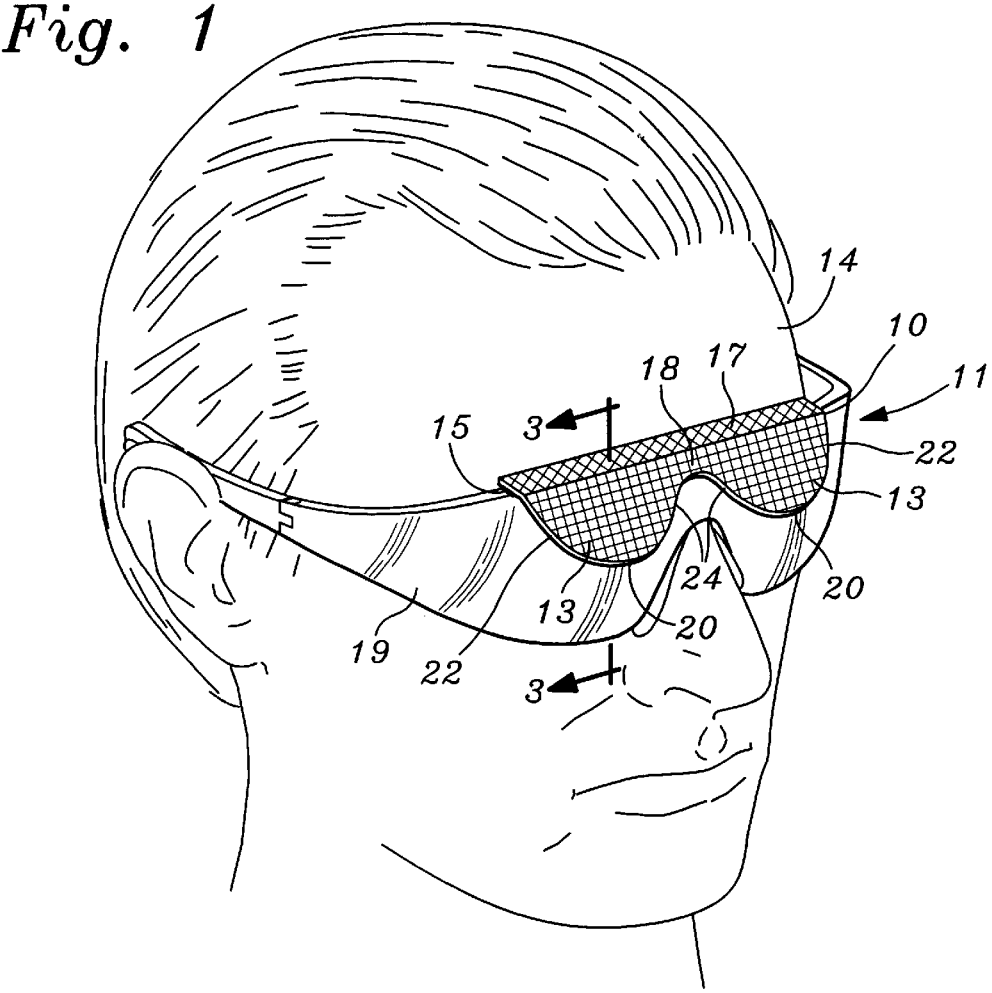
FIG. 1 is a front perspective view of a pair of eyeglasses or sunglasses shown on the head of a person, with one embodiment of an anti-glare device in accordance with the present invention secured thereto.
Figure 3:
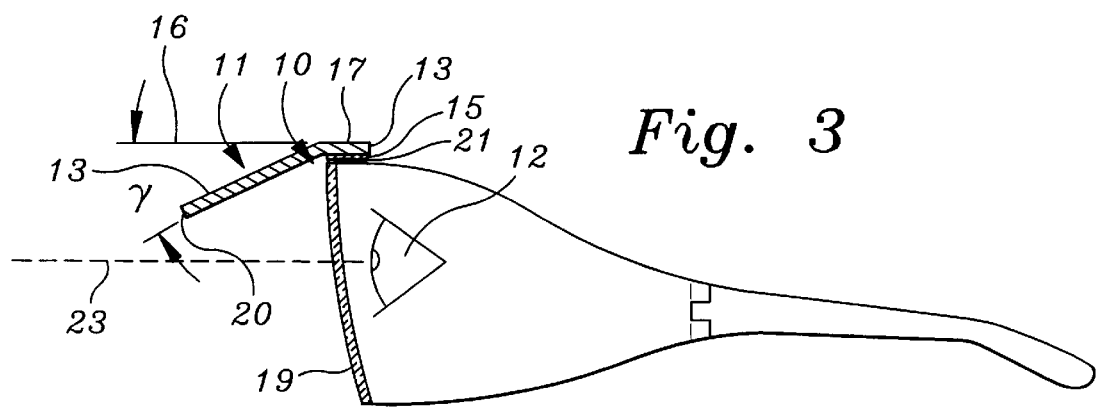
FIG. 3 is a cross sectional view taken along lie 3—3 of FIG. 1.

Referring to FIGS. 1 and 3 of the drawings, there shown is a first embodiment 11 of an anti-glare device of the present invention, held or secured to a pair of glasses 19, such as eyeglasses or sunglasses, worn on the head of a user 14. The device 11 includes a pair of semi-circular or semi-heart-shaped lens-type element 13, connected by a bridging section 18, and, secured by a securing element or portion 17 to a flat top portion of the glasses 19. The securing or holding element 17 is an elongated strip of material releasably or permanently secured to the flat top portion 21 of the glasses 19 by a securing means 15, such as adhesive or holding elements. A hinge 10 may be provided to allow the lens-type portions 13 to be rotated between a lower position indicated by the angle gamma in FIG. 3 and an elevated position. The angle gamma is approximately 25% of the distance from a horizontal line 16 passing through the top securing portion 17 to a vertical line through the lenses of glasses 19. That is, between about 20°–25° from line 16, or about 65° to 75° from the vertical.

The lens-type portions 13 are semi-opaque, made from a very dark non-reflective material, such as plastic, resin CR39, or other similar material, allowing only approximately 8%–10% of the light impinging thereon to pass through and into the eyes of a wearer. The glasses 19 may be of any desired type, and can be tinted, so long as the tinting is not as dark as the lens-type portions 13. Furthermore, the lens-type portions 13 are preferably sized and dimensioned as shown, so as to have substantially flat top portion at the hinge 10, and semi-circular or semi-heart-shaped lower portions secured together by a bridging section 18. If the hinge portion 10 is used, it allows the lens-type portions 13 to be moved from the lowered position shown in FIGS. 1 and 3, to an elevated position, approximately parallel to or even above the line 16 of FIG. 3.

As specifically shown in FIG. 3, when a person is wearing the glasses 19 with the visor device 11 of the present invention thereon, the person's eyes 12 will focus or look along a line of sight 23, as, for example, when driving. The lens-type portions 13 will be in the partially lowered position shown in FIGS. 1 and 3, so as to block low sun rays, but still allow the person to look directly ahead and see along the line of sight 23, as well as to both sides of the lens-type portions. The lenses 13 will block UVA light and possibly UVB light, and when used while looking along the line of sight 23, will still allow a wearer to see the position of the sun, without glare.

The contour and placement of lens-type sun blocking portions 13, and other lens-type elements described herein cause a phenomenon wherein both sun blocking portions converge as one before the eyes of a wearer. Furthermore, all the lens-type sun blocking portions are sized and dimensioned so that they are large enough to cover all eyes, regardless of their distance apart, so as to be comfortably protected, with no glare.

The semi-circular or semi-heart-shaped lens-type portions 13 preferably include semi-circular bottom portions 20, and angled side portions 22, 24, which are tangent to and flow smoothly into the semi-circular bottom portions 20. Additionally, the center-to-center distance between the lenses 13 is approximately equal to the average inter-pupillary distance between the eyes of an average adult, such as of a driver of a vehicle. And, as described above, the lens-type portions 13 are of sufficient size to easily cover the eyes of a wearer, and perform as described herein to save lives, regardless of the distance between a wearer's eyes.

Figure 2:
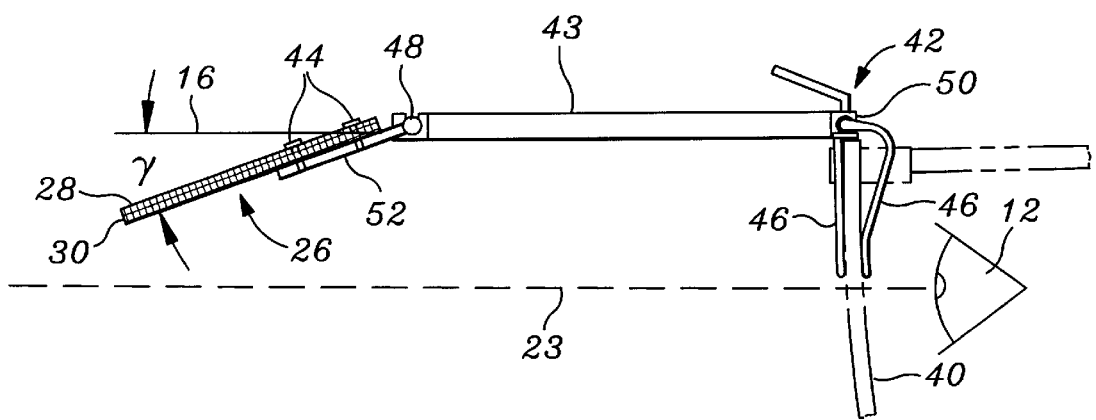
FIG. 2 is a side elevational view of a second embodiment of an anti-glare device, mounted on a pair of glasses by a spring clip.
Figure 4:
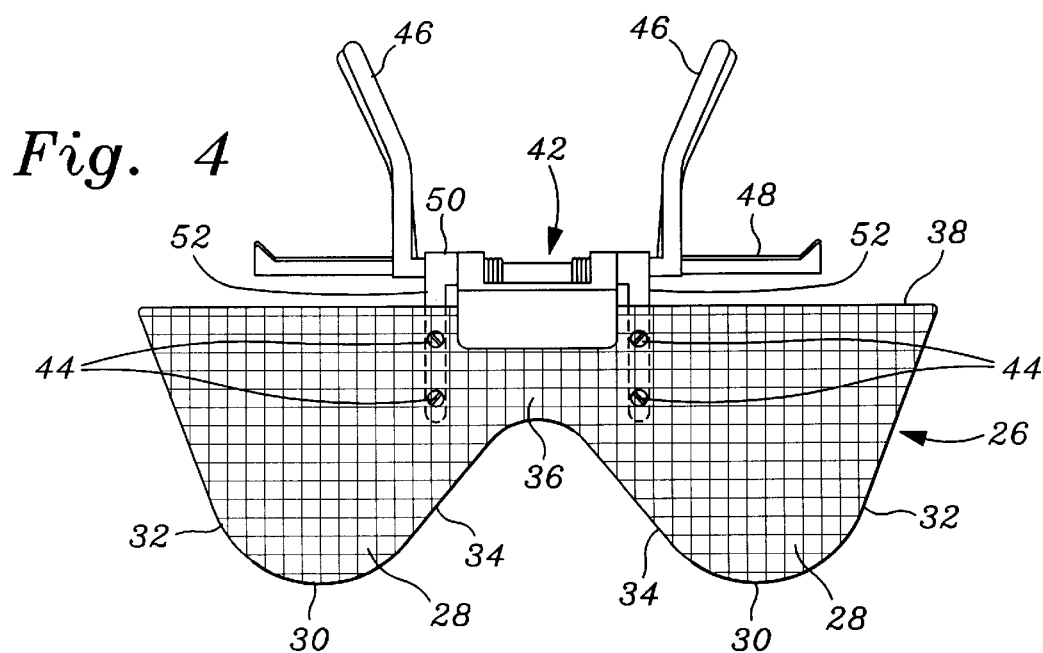
FIG. 4 is a third embodiment of an anti-glare device of the present invention, having a clip-on securing means for attachment to a frame, a pair of eyeglasses or a pair of sunglasses.
Figure 5:
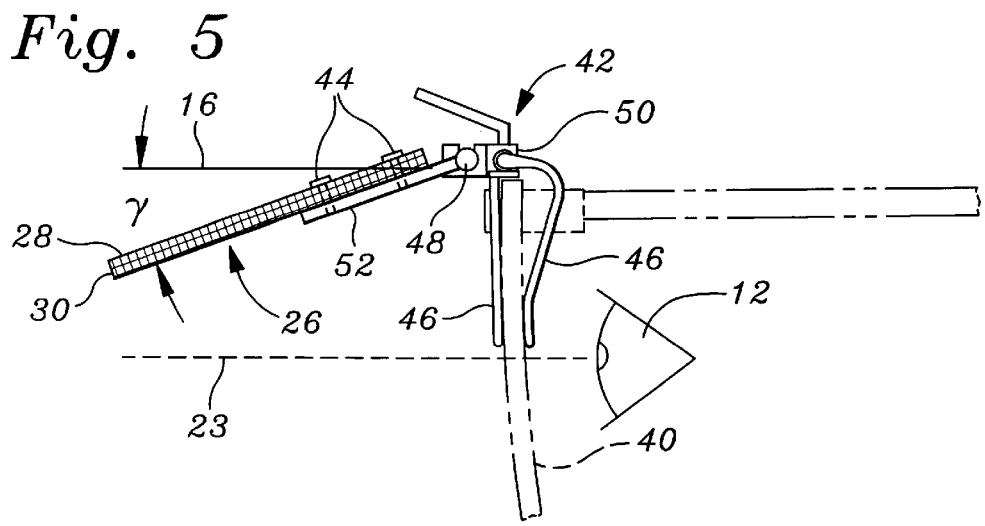
FIG. 5 is a side elevational view of the device of FIG. 4, shown mounted on a pair of eyeglasses or sunglasses.

Referring now to FIGS. 2, 4 and 5, there shown, are second and third embodiments of an anti-glare device 26, having lens-type portions 28, which include rounded or semi-circular bottom portions 30, and which are substantially the same size and shape as the semi-circular bottom portions 20 of the sun blocking lens-type elements 13. The lens-type elements 28 also include angled side edges 32, 34, which are at substantially the same angle as the side edges 22, 24, and which are tangent to the semi-circular bottom portions 30. The lens-type portions 28 are connected by a bridging portion 36 and have a substantially flat upper edge or portion 38. The anti-glare device 26 may be mounted on a pair of eyeglasses or sunglasses 40, shown in broken line in FIGS. 2 and 5, by means of a securing or holding element 42, such as a spring clip. The spring clip is held or secured to the device 26, on either side of the bridging section 36, by mechanical securing elements 44, such as screws, or the like. In the case of the second embodiment shown in FIG. 2, the device 26 and holding element 42 are spaced away from the glasses, a predetermined distance, by a spacing bar 43. The securing element 42 in each of the second and third embodiments includes clip elements 46, which are spring biased, and grasp lenses or the frame of the pair of eyeglasses or sunglasses 40, in a manner well known to those skilled in the art, as shown in FIGS. 2 and 5. The clip elements 46 are mounted on one end of the spacing bar 43 secured to a holding portion of bar 48 (FIG. 2), or directly to the holding portion or bar 48 (FIGS. 4 and 5). The holding bar 48 is rotatably mounted at an outer end of spacing bar 43 (FIG. 2), or in a bracket 50 (FIGS. 4 and 5), so as to move between a vertical position, substantially aligned with or above the glasses 40, and a lowered position at the angle gamma, of approximately 20°–25° from the vertical line 16, as shown in FIGS. 2 and 5. The holding bar 48 or bracket 50 include lower arms or extending portions 52 to which the anti-glare device 26 is secured by the holding elements 44. The holding bar or bracket 50 also include a stop element or finger, so as to prevent the device 26 and lenses 28 of the sunshield 26 from being lowered further than shown in FIGS. 2 and 5. That is, to save lives, the lenses 28 of FIG. 5 cannot be lowered to a vertical position in front of the eyeglasses 40, or the eyes of a person wearing the same, so as to impair the vision of such person when looking straight ahead. However, in their lowered position the lenses 28 will act to block the lower rays of the sun, and prevent glare from impairing the sight of a wearer so as to allow the wearer to perform outdoor activities or safely drive a vehicle.

Figure 6:
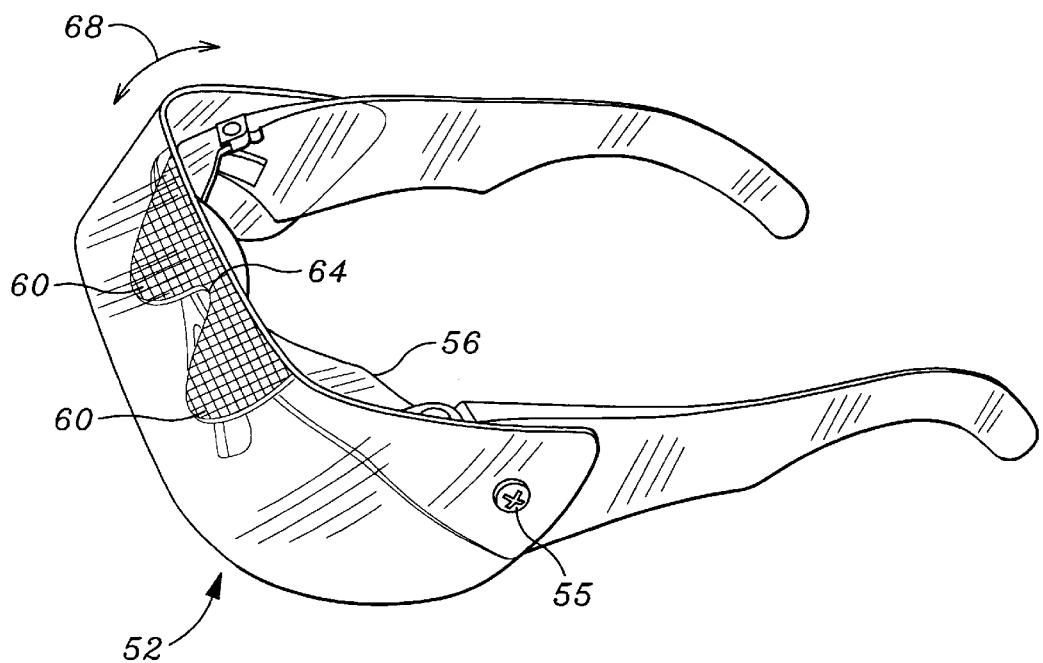
FIG. 6 is perspective view of a fourth embodiment of an anti-glare device of the present invention mounted on a sunshield or visor, rotatably secured to a pair of lensless frames.
Figure 7:
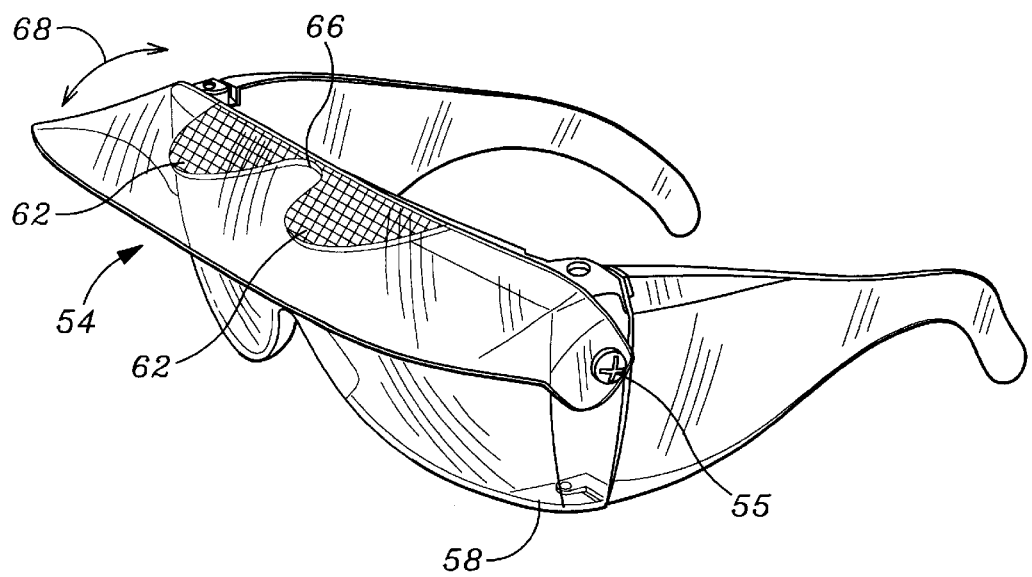
FIG. 7 is a perspective view of a fifth embodiment of the present invention, showing a rotatable sun visor with the anti-glare device secured to the sun visor, which is rotatably-mounted on a pair of wrap-around sunglasses.

Referring now to FIGS. 6 and 7, there shown are fourth and fifth embodiments of the anti-glare device of the present invention, mounted on or secured to tinted sun visors 52, 54. The sun visor 52 is rotatable secured on a pair of lensless frames 56, by holding or securing elements 55, such as screws, or the like, while the sun visor 54 is rotatably secured on a pair of wrap-around sunglasses 58, by securing elements 55. In each of these fourth and fifth embodiments, a pair of very dark lens-type portions 60, 62 are secured to or formed on the rotatable sun visors 52, 54. The lens-type portions 60, 62 are as dark as and substantially the same shape as the lens-type portions 13, and 28 of the devices 11 and 26 of the first three embodiments of the invention. Furthermore, the lens-type portions 60 and 62 may include a bridging element 64, 66 therebetween. Each of the sun visors 52, 54 may be made from any plastic material, and act as a further sun blocker, while the lens-type portions 60 and 62 are made from the same dark plastic or resin material, or a coating of dark material, as disclosed above, which blocks out substantially all of the sun's rays, while allowing approximately 8%–10% of the light therethrough. These sun visors 52, 54 are movable in the direction of arrows 68, 70, between elevated positions, over the frames 56, 58, to lowered positions, at substantially the same angle gamma, as shown in FIGS. 3 and 5. These sun visors 52, 54, together with the lens-type portions 60, 62 to allow a person to look through the lensless frames or wrap-around glasses 56, 58 to see straight ahead. However the low rays of the sun will be blocked by the lens-type portions 60, 62.

It, therefore, can be seen that the various embodiments of the anti-glare devices of the present invention can be easily secured or fixed to a pair of eyeglasses, frames, sunglasses, or sun visors, to block the lower rays of the sun and enhance the comfort of a user and/or the safety of drivers. The darkened lens-type portions of the devices of the present invention block substantially all of the glare of the sun's rays, but do allow some light through, so that a person can see the position of the sun. Furthermore, at the same time, without moving their head, the wearer may look straight ahead, so as to safely move about out of doors, or around any obstacles or vehicles in a roadway, while driving.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An anti-glare attachment for eyeglass frames, comprising:

releasable securing means for attaching the anti-glare attachment to the eyeglass frames;

a pair of spaced-apart light-blocking elements secured to the releasable securing means; the pair of spaced-apart light-blocking elements being made from a material, which blocks substantially all of the sun's rays impinging thereon;

the releasable securing means allowing the pair of spaced-apart light-blocking elements to be manually-tiltable between an opened position, above the eyeglass frames, and a closed position, at an angle of between 20° and 25° from a horizontal line passing perpendicularly through the eyeglass frames;

the pair of spaced-apart light-blocking elements being semi-heart-shaped and mounted on a rotatable sun visor;

the releasable securing means are securing elements passing through the sun visor into the eyeglass frames; and a stop element to prevent rotation of the rotatable sun visor beyond the closed position.

2. The anti-glare attachment of claim 1 wherein the eyeglass frames have no lenses held therein.

3. The anti-glare attachment of claim 1 wherein the eyeglass frames are wrap-around sunglasses.

4. An anti-glare attachment for sunglasses, comprising, in combination:

the sunglasses having a frame with a front having a flat top and a pair of temples;

releasable securing means securing the anti-glare attachment to the flat top;

a pair of very dark light-blocking elements secured to the anti-glare attachment; the pair of very dark light-blocking elements including a bridging section therebetween, and being sized and dimensioned to block between from about 90% to about 92% of the sun's rays impinging thereon; and the releasable securing means allowing the pair of very dark, light blocking elements to be manually tilted between a raised position, away from the front of the sunglasses, and a lowered position, which is at an angle from between 20° to 25° from a horizontal line passing perpendicularly through the front.

5. The anti-glare attachment of claim 4 wherein the releasable securing means is an elongated strip of material secured to the flat top.

6. The anti-glare attachment of claim 5 wherein the sunglasses include a pair of spaced-apart lenses, with the releasable securing means being a pair of clip elements rotatably secured to the pair of spaced-apart lenses and removably held on the sunglasses.

7. The anti-glare attachment of claim 6 wherein the pair of very dark light-blocking elements are connected together by a bridging element, and include semicircular bottom portions with angled side portions, which are tangent to the semicircular bottom portions.

8. The anti-glare attachment of claim 7 wherein the pair of very dark light-blocking elements are semi-heart-shaped and mounted on a rotatable sun visor; and wherein the releasable securing means are securing elements passing through the rotatable sun visor into the frame.

9. The anti-glare attachment of claim 7 wherein the sunglasses are wrap-around sunglasses.

10. An anti-glare attachment for sunglasses, comprising, in combination:

a frame having a front with a flat top, and a pair of temples;

securing elements securing the anti-glare attachment to the front;

a pair of very dark sun-blocking elements secured to the anti-glare attachment; the pair of very dark sun-blocking elements including a bridging section therebetween, and being sized and dimensioned to fit over eyes of a wearer and block between from about 90% to about 92% of the sun's rays impinging thereon; and the securing elements including a plurality of spring clips releasably secured to lenses held in the sunglasses; and allowing the pair of very dark sun-blocking elements to be manually tilted between an elevated position, away from the front of the sunglasses frames and a lowered position, which is at an angle from between 20° to 25° from a horizontal line passing perpendicularly through the front.

11. The anti-glare attachment of claim 10 wherein the pair of very dark sun-blocking element includes semicircular bottom portions with tangent, angled side edges.

12. The anti-glare attachment of claim 11 wherein the pair of very dark sun-blocking elements are semi-heart-shaped and mounted on a rotatable sun visor; and wherein the securing elements pass through the sun visor into the frame.

13. The anti-glare attachment of claim 11 wherein the sunglasses are wrap-around sunglasses.

14. The anti-glare attachment of claim 10 wherein the sunglasses have no lenses therein.

15. The anti-glare attachment of claim 10, further including a spacing bar between the securing elements and the pair of very dark sun-blocking elements to space the pair of very dark sun-blocking elements a predetermined distance from the front.

16. The anti-glare attachment of claim 10, further including a stop element to prevent the sun-blocking elements from moving past the lowered position.

* * * * *